United States Patent [19]
Parant

[11] Patent Number: 5,740,095
[45] Date of Patent: Apr. 14, 1998

[54] PARALLEL MULTIPLICATION LOGIC CIRCUIT

[75] Inventor: Philippe Parant, Biviers, France

[73] Assignee: SGS-Thomson Microelectronics, S.A., Gentilly, France

[21] Appl. No.: 501,675

[22] Filed: Jul. 12, 1995

[30] Foreign Application Priority Data

Jul. 15, 1994 [FR] France ................. 94 08950

[51] Int. Cl.$^6$ .................................... G06F 7/52
[52] U.S. Cl. .................................... 364/760
[58] Field of Search ...................... 364/760, 754, 364/757

[56] References Cited

U.S. PATENT DOCUMENTS 5,253,195  10/1993  Broker et al. ............... 364/760
5,465,226  11/1995  Goto ............................ 364/760

FOREIGN PATENT DOCUMENTS 0276520  8/1988  European Pat. Off. .
0545654  6/1993  European Pat. Off. .

OTHER PUBLICATIONS

Richard, et al., "Fast–LSI, A Second Generation Advanced Schottky Technology," Electro 84. Electronic Show and Convention, Boston, MA, pp. 9/1/1–9 (1984).

Goto, et al., "A 54×54–b Regularly Structured Tree Multiplier," IEEE Journal of Solid–State Circuits, vol. 27, No. 9, p. 1229 (1992).

Primary Examiner—Tan V. Mai
Attorney, Agent, or Firm—Robert Groover; Betty Formby; Matthew Anderson

[57] ABSTRACT

A multiplication circuit having a Booth decoder, a partial product generator and a computation and formatting circuit. An incrementing device is combined with the computation circuit, enabling an anticipated incrementation if it is desired to obtain a rounded result.

20 Claims, 5 Drawing Sheets

PARALLEL MULTIPLICATION LOGIC CIRCUIT

BACKGROUND OF THE INVENTION

1. Field of the Invention

The present invention relates to a parallel multiplication logic circuit.

A main aim of the development of applied technologies in integrated circuits is to increase processing speeds. A field more particularly concerned by this development is digital data processing, notably by microcontrollers or microprocessors or digital signal processors (DSP). These circuits often have, inter alia, multiplication circuits that enable the performance of processing operations on series of logic signals X and Y and the production of a series of output logic signals P such that these series of (physical) signals represent binary data elements respectively referenced $X_d$, $Y_d$ and $P_d$ with:

$X_d$ and $Y_d$ being binary operands (a multiplicand $X_d=(x_{d,n-1}, x_{d,n-2}, \ldots, x_{d,1}, x_{d,0})$ and an n bit multiplier $Y_d=(y_{d,n-1}, y_{d,n-2}, \ldots, y_{d,1}, y_{d,0})$, n being an integer), $P_d$ being the binary result encoded on 2*n bits ($P_d = X_d * Y_d = (P_{d,2n-1}, P_{d,2n-2}, \ldots, P_{d,1}, P_{d,0})$)

Typically, n is an even integer and most usually it is a power of 2, for example 16.

2. Description of the Prior Art

The basic technique of binary multiplication is to compute:

$P_d = X_d * Y_d = \Sigma_i P_{d,i} * 2^i$ with $P_{d,i} = X_d * Y_{d,i}$ with $Y_{d,i}$ referring to the $(i+1)^{th}$ bit of the multiplier, i being an integer from 0 to n−1. $P_{d,i}$ which is a binary data element encoded on n bits ($P_{d,i}=0$ or $X_d$) is commonly called a partial product.

There are techniques by which it is possible to reduce the number of partial products in order to diminish the processing time by diminishing the number of additions of partial products.

A particularly valuable technique consists in performing what is known as a Booth decoding operation (see A.D. Booth, "A signed binary multiplication technique", Quart. J. Mech. Appl., 4, Pt 2, pp. 236–240, 1951). In this method, the reasoning is done not in taking the bits of the multiplier successively but in assembling them.

Indeed, it is possible for example to write:

$Y_d = \Sigma_j (y_{d,j-1} + y_{d,j} - 2*y_{d,j+1})*2^j$, with j as an even integer ranging from 0 to n−1 and $y_{d,-1}=y_{d,n}=0$ (grouped in sets of three centered on the even-order bits of the multiplier with an overlapping of one between two groupings corresponding to positions j taking two neighboring even-parity integer values).

The computation of $P_d = X_d * Y_d$ is then reduced to the addition of n/2 partial products $P'_{d,j}$ (if n is an even number, which is always the case in practice), with:

$P'_{d,j} = (y_{d,j-1} + y_{d,j} - 2*y_{d,j+1})*X_d$ and $P_d = \Sigma_j (S_{d,j} \& P'_{d,j})*2^j$.

We will have $P'_{d,j}=0$, $\pm X_d$ or $\pm 2X_d$ depending on the values of the bits $y_{d,j-1}$, $y_{d,j}$ and $y_{d,j+1}$.

& represents the concatenation operator.

$S_{d,j}$ is a binary data element encoded on (n−j) bits called sign extension bits, associated with the partial product $P'_{d,j}$ such that:

if the partial products $P'_{d,j}$ have a sign identical to that of the multiplicand ($P'_{d,j}=0$, $X_d$ or $2X_d$) these (n−j) bits are conventionally positioned at 0, if the partial products have opposite signs ($P'_{d,j}=-X_d$ or $-2x_d$) then all these bits are positioned at 1.

This computation therefore amounts to formally considering partial products $P''_{d,j}$ encoded on 2*n bits $P_{d,j,0}$ to $P_{d,j,2n-1}$ such that:

$P_d = \Sigma_j P''_{d,j}$, the bits $P_{d,j,0}$ to $P_{d,j,j-1}$ are at 0 for j≧2, the bits $P_{d,j,j}$ to $P_{d,j,j+n-1}$ represent $P'_{d,j}$, the bits $P_{d,j,j+n}$ to $P_{d,j,2n-1}$ represent $S_{d,j}$.

It will be noted that in practice it is possible to start the Booth decoding from a bit of any order of the multiplier and limit the operation to standard partial products (namely having the shape $X_d * y_{d,i}$) for the lower-order bits. It would have also been possible to consider a grouping of more than three. The drawback of this is that it could produce partial products of the $\pm 3X_d$ type. This complicates the circuit and substantially increases the processing time.

Typically, a circuit enabling the implementation of a signal processing operation corresponding to the above computation will comprise:

a decoder receiving the series of signals Y and producing selection signals, a generator of partial products receiving the series of signals X at input, comprising:

means for the series production of signals representing 0, $\pm X_d$, $\pm 2X_d$, a multiplexing circuit receiving, firstly, the series of signals representing 0, $\pm X_d$, $\pm 2X_d$ at input, and secondly, the selection signals, and giving a series of logic signals $P'_j$ representing partial products $P'_{d,j}$ at output as defined here above for a three by three grouping of the bits of the multiplier (the selection signals in practice are multiplexer control signals), sign extension means receiving the series $P'_j$ and the selection signals and producing series of logic signals $P''_j$ representing data elements $P''_{d,j}$ (in practice the series $P''_j$ will comprise (2*n−j) signals, the bits $p_{d,j,0}$ to $p_{d,j,j-1}$ being always zero and therefore having no influence on the result), a computation circuit receiving the series $P''_j$ and producing the series P of (2*n) logic signals by reducing the number of series $P''_j$ by means of addition circuits formed by elementary adders.

It would be very easy to extend the above general method so as to propose a choice between signed arithmetic and unsigned arithmetic. Conventionally, if the operands are relative (positive or negative, signed arithmetic), the value of their most significant bit indicates their sign (typically negative if this bit is at 1 and positive if this bit is at 0).

Of course, it should be possible, in the circuit that applies the multiplication, to have logic signals which then make it possible to know which is the choice made. For this purpose, it is enough to define two binary variables encoded on one bit, hereinafter referenced tcx and tcy, the values of which will define the signed or unsigned character of the operands (for example 1 if the operands are signed and 0 if not).

The following will then be taken into account:

the variable tcy associated with the multiplier in the grouping of the bits of the multiplier as if the multiplier were encoded on n+1 bits, the most significant bit being tcy, and the variable tcx associated with the multiplicand to format the result $P_d$ of the final addition.

In practice, this makes it necessary, in the event of a grouping by three centered on the even-order bits of the multiplier, to add an additional decoding cell to compute $y_{d,j-1}+y_{d,j}-2*y_{d,j+1}$, such that j=n, $y_{d,j-1}=y_{d,n-1}$, $y_{d,j}=tcy$ and $y_{d,j+1}=0$.

It will therefore, in this case, be more judicious to perform a grouping centered on the odd-order bits. Indeed, it is possible to write $Y_d = -y_{d,0} = \Sigma_j (Y_{y,j-1} + y_{d,j} - 2^* y_{d,j} + 1) + 2^j$, with j as an odd-parity integer ranging from 1 to n−1 and $y_{d,n} = tcy$. The application of the above formula will produce n/2 (n even) partial products implying a decoding and a standard partial product equal to $-X_d^* y_{d,0}$.

Furthermore, it may be desired to carry out multiplication operations on pure fractional type numbers, namely numbers ranging from 0 to 1.

It is also possible if necessary to implement a rounding operation.

Conventionally then, at output there will be a formatting circuit receiving, at input, a series of logic signals $P_f$ representing a binary data element $P_{df}$ resulting from the addition of the partial products $P''_j$ and from a formatting operation (the taking of tcx into account) and also receiving control signals, and giving the series P such that:

by letting & denote the concatenation operator, MSB and LSB the n most significant bits and the n least significant bits of the result $P_{df}$ of the addition of the partial products, there will be a choice among the following:

$P_d$=MSB & LSB (in unsigned arithmetic and in signed arithmetic on integers).

$P_d$=(MSB & LSB)*2 in signed and fractional arithmetic. Indeed, advantageously a leftward shift by one position will be made enabling the precision in the fractional part to be increased by one unit. The two 2n−2 and 2n−1 order bits of $P_{df}$ indeed represent two sign bits. This provides no further information than only one bit. Indeed, after the shift, the least significant bit will still be positioned at 0. For the integers, it is not advisable to act in this way inasmuch as such a shift is equivalent to a multiplication by two of the final result after formatting. In other words, it amounts to substantially modifying this result.

$P_d = (PE = PFr^* 2^{r+1}) \& 0_{0\ldots r}$ in rounded arithmetic, which consists in positioning the zero-order least significant bits at a position r to 0 (r as a natural integer) and in adding the r-order bit to the r+1 order bit. PE, references the part of the final result after formatting that includes the r+1 to 2n−1 order bits, PF the part of the result formed by the 0 to r order bits, r the order value of the most significant bit of the part PF, PFr the value of the r-order bit of the result to be rounded and $0_{0\ldots r}$ a binary data element encoded on r+1 bits, all the bits of which are at 0. It will be noted that by combining the above mode with this one (rounded fractional arithmetic, the operands being signed), the following computation is made in practice:

$P_d = (((PE \& PF)^*2) + PFr^* 2^{r+1}) \& 0_{0\ldots r}$ PFr being of course the value of the r-order bit of $P_{df}$ after shifting, namely the value of the r−1 order bit before shifting.

A drawback linked to the rounding operation is that it is necessary to have a bulky incrementing device at output to carry out the rounding operation, this incrementing device having to process (2*n−r−1) signals (owing to the propagation of the carry to the most significant bit of the data element $P_d$).

The inventor proposes a reduction in the number of sign extension bits and hence the number of signals representing these bits, with a maximum of three per partial product, such that this sign extension is encoded on the j+n to j+n+2 order bits, while at the same time also taking account of the signed or nonsigned character of the multiplicand. Thus, a reduction is obtained in the number of elementary adders in the addition circuits (the j+n+3 to 2n−1 order bits of the partial products $P''_{d,j}$ being always identically zero, hence not modifying the result of the addition of the partial products), and the processing time is also reduced.

Indeed, let i be equal to a value from 0 to n, $\Sigma_i q^i = (1 - q^{n+1})/(1-q)$.

If q=2, then $\Sigma_i q^i = 2^{n+1} - 1$.

The inventor has shown that by taking the following references:

l is the number of partial products $P''_{d,j}$.

j+n−1 is the most significant position of the partial products not representative of the sign, $S_1$ represents the n−j sign extension bits of a partial product, all these n+j to 2n−1 order bits being in the same logic state 0 or 1, S represents the sum of the sign extension bits of all the partial products, then
$S = \Sigma_1 (\Sigma_t S_1 ^* 2^t)$, t as an integer from n+j to 2n−1, and
$S = \Sigma_1 S_1 (2^{2n} - 2^{j+n})$.

It is possible to eliminate the first term if the partial products are encoded on 2n bits. There therefore remains:

$$S = -\Sigma_1 S_1 ^* 2^{j+n} = \Sigma_1 (/S_1 + 1) ^* 2^{j+n}$$

In the case of a grouping by three, it is deduced therefrom that the binary data element formed by the n−j sign extension bits that are j+n to 2n−1 order bits of the partial products can be reduced to a binary data element encoded on three bits $ES_{d,j} = (es_{d,j,2}, es_{d,j,1}, es_{d,j,0})$, and it is possible to encode the sign extension bits of the partial products on their j+n to j+n+2 order bits with:

if the partial product is obtained in a standard way, on the basis of an $X_d^* y_{d,i}$ type computation:
$ES_{d,j} = (0, 0, 1)$ if tcx=$Y_{d,i} = x_{d,n-1} = 1$, and if not $ES_j = (0, 1, 0)$.

if the partial product is obtained from a grouping by three following the Booth method:
$ES_{d,j} = (0, 0, 1)$ if $P'_{d,j} = 0$.
$ES_{d,j} = (0, 0, 1)$ if tcx=0 and $P'_{d,j} = X_d$.
$ES_{d,j} = (0, 1, 0)$ if tcx=0 and $P'_{d,j} = -X_d$ (or /$X_d$).
$ES_{d,j} = (x_{d,n-1}, /x_{d,n-1}, /x_{d,n-1})$ if tcx=0 and $P'_{d,j} = 2X_d$.
$ES_{d,j} = (0, /x_{d,n-1}, x_{d,n-1})$ if tcx=0 and $P'_{d,j} = -2X_d$ (or /2$X_d$).
$ES_{d,j} = (0, 1, /x_{d,n-1})$ if tcx=1 and $P'_{d,j} = X_d$ or 2$X_d$.
$ES_{d,j} = (0, 1, x_{d,n-1})$ if tcx=1 and $P'_{d,j} = -X_d$ (or /$X_d$) or $-2X_d$(or 2/$X_d$).

The taking into account of tcx in the reduction of the number of sign bits has the advantage of eliminating a processing operation from the final result of the addition, as was the case earlier.

The invention proposes to take advantage of the reduction in the number of sign extension signals to carry out the operation of incrementing the rounded function (corresponding to the fact that the r-order bit of the final result is at 1) in the addition circuits so as to reduce the size of the incrementing device performing this operation (which amounts formally to limiting the propagation of the carry in the rounding of the output data element).

In the processing of the series of output signals P, it is thus possible to limit the operation to a $P_d$=PE & $0_{0\ldots r}$ type operation (without shift) or $P_d$=((PE & PF) * 2) & $0_{0\ldots r}$ type operation (with shift).

Since there is no prior knowledge of the value of the r-order signal of the final result before rounding the invention proposes the methodical adding of $2^r$ (without shift) or $2^{r-1}$ (with shift) to one of the partial products.

Indeed, if we take the formula $P_d = (PE + PFr * 2^{r+1}) \& 0_0$ ... r (without shift):

if the r-order bit PFr of the final result is normally at 0, the part PE remains identical before and after concatenation with $0_0 \ldots _r$. If $2^r$ is added to a partial product and if the formula $P_s=PE=0_0 \ldots _r$ are used, the same result is obtained, if the r-order bit PFr of the final result is normally at 1, the part PE is incremented by 1 before concatenation with $0_0 \ldots _r$. If $2^r$ is added to a partial product and if the formula $P=PE \& 0_0 \ldots _r$ is used, the same result is also obtained. The incrementation is done beforehand in the computation circuit.

The invention proposes to carry out the operation that consists in the adding together of the data elements $(0, 0, \ldots, 1, 0)$ and $(ex_{d,j,2}, ex_{d,j,1}, ex_{d,j,0}, p_{d,j+n-1}, \ldots, p_{d,j,r}, p_{d,j,r-1})$, deduced from one of the partial products, having a dimension j+n+4−r and to replace the latter data element by the result of this operation, the carry being placed at the j+n+3 position. A modification of one of the partial products is therefore made before it is taken into account in the computation circuit.

If it is desired, in fractional arithmetic with signed operands, to carry out a leftward shift in order to improve the precision, it will of course be seen to it that the first vector is modified so as to add the vector $(0, 0, \ldots, 0, 1)$ to $(ex_{d,j,2}, ex_{d,j,1}, ex_{d,j,0}, p_{d,j+n-1}, \ldots, p_{d,j,r}, p_{d,j,r-1})$.

The best way is to carry out this operation of incrementation on the partial product that has the greatest number of most significant bits always at zero in order to limit the propagation of the carry to the strict minimum.

Furthermore, it will be observed that by considering a partial product obtained according to the standard method $(X_d * y_{d,i})$, it is possible to reduce the size of the incrementing device, the reduction in the number of sign extension bits then producing a j+n+2 order bit that is always zero. It is then possible to add data elements encoded on j+n+3−r bits.

SUMMARY OF THE INVENTION

Thus, the invention proposes A parallel multiplication logic circuit receiving a first series and a second series of n logic signals, representing two binary data elements, a multiplicand and a multiplier encoded on n bits, where n is an integer, and producing a series of 2*n output logic signals representing an output binary data element encoded on 2*n bits, comprising:

a circuit producing logic selection signals from the second series of signals, a partial product generator producing series of intermediate logic signals by the combination of the first series of signals and of the selection signals, a computation and formatting circuit receiving the series of intermediate signals and producing the series of output signals, wherein the computation circuit comprises an incrementation circuit to produce a series of input signals from a series of signals received by this incrementation circuit by the modification, through the action of the control signals received by the logic circuit, of the signals of the series of signals received.

Another drawback is the presence of n-bit incrementing devices to produce the series of signals representing $-X_d$ and $-2X_d$ ($-X_d=/X_d+2^0$) if a Booth decoding is used to produce the partial products.

With regard to this drawback, the invention proposes to modify the partial product generator by producing series of signals representing $0, X_d, /X_d, 2X_d, /(2X_d)$, and carrying out the incrementation corresponding to the production of $-X_d$ and $-2X_d$ from $/X_d$ and $/(2X_d)$ (hereinafter referenced $/2X_d$) at the time of processing corresponding to the addition of the partial products.

As we have seen, the partial products $P''_{d,j}$ have their j least significant bits $p_{d,j,0}$ to $p_{d,j,j-1}$ in the 0 state. The incrementation to be made if these partial products have signs opposite the multiplicand can be likened to the adding of $2^j$ to these partial products in assuming that their bits $p_{d,j,j}$ to $p_{d,j,j+n-1}$ represent $/X_d$ or $/2X_d$. The invention proposes to modify the partial products $P''_{d,j}$ as defined at the outset in considering partial products having the form $P''_{d,j}+\Sigma_k (\alpha_k*2^k)$, with k as an index that is an integer from 0 to j−1 and $\alpha_k$ as a coefficient equal to 0 or 1, the bits $p_{d,j,j}$ to $p_{d,j,j+n-1}$ representing $0, X_d, 2X_d, /X_d$ or $/2X_d$. This amounts to carrying the incrementation due to an opposite sign to another partial product having a greater number of least significant bits normally at 0.

In practice, indeed, the presence of the bits $p_{d,j,0}$ to $p_{d,j,j-1}$ is expressed by the permanent grounding of the inputs of elementary adders of the computation circuit. The invention therefore proposes to modify the wiring of a standard computation circuit by giving certain of its adder inputs logic signals representing the sign of a partial product as compared with the sign of the multiplicand. This does not in any way modify the time taken to go through these adders.

If it is not possible to take account of the implementation in another partial product (in practice this amounts to the case of the partial product such that j is the greatest value), it is enough to modify the addition circuit receiving the series of signals corresponding to said partial product and more particularly all the inputs of the elementary adders receiving the signals relating to the least significant bits normally wired to the ground.

In a preferred version, elementary adders of all the addition circuits receive one of the selection signals at one input.

The invention enables the processing of the first and second series of signals in using a partial product generator without incrementing devices, comprising a leftward shift circuit producing a third series of signals by the leftward shift of the first series of signals, an inversion circuit producing a fourth and a fifth series of signals by the inversion of the first and third series of signals, a multiplexing circuit receiving the first, third, fourth, fifth series of signals and a sixth series of signals with constant logic states, this multiplexing circuit also receiving the selection signals and, through the action of these selection signals, producing series of derived signals such that each series of derived signals is equal to one of the five series of signals received by the multiplexing circuit, a sign extension circuit producing series of sign extension signals by the action of the selection signals and comprising concatenation circuits to produce the series of intermediate signals by concatenation of one of the series of signals derived, and hence of one of the series of sign extension signals.

In a preferred version, the addition circuits form a so-called Wallace tree described in the literature (see for example C. S. Wallace, "A suggestion for a fast multiplier", IEEE Trans. El. Computers, Vol. EC-13, pp. 14–17, No. 1, 1964) enabling a reduction in the time needed to carry out the processing corresponding to the addition of the partial products $P''_{d,j}$ obtained by grouping them in sets of odd numbers of partial products, and by simultaneously adding the partial products of the different sets by means of elementary adders, principally of the Carry Save Adder type.

On the basis of the partial products $P''_{d,j}$ generated by the Booth decoding, there are thus generated other partial products which are smaller in number (reduction of the partial products). These partial products are themselves added up until the operation is reduced to a final addition of two data elements of 2n bits. This type of parallel structure is known but described for use in the case of operations on partial products having the same sign (namely of the standard $X_d$ *$y_{d,i}$ type, without any sign extension bits).

As compared with a regular structure (with the addition in series of the partial products with carry propagation), the total surface area is greater by about 20% but the processing time falls by 20%.

BRIEF DESCRIPTION OF THE DRAWINGS

The invention shall be understood more clearly and other particular features and advantages shall appear from the following description of a preferred and non-restricted exemplary embodiment, read in conjunction with the appended drawings, of which.

MORE DETAILED DESCRIPTION

Figure 1:
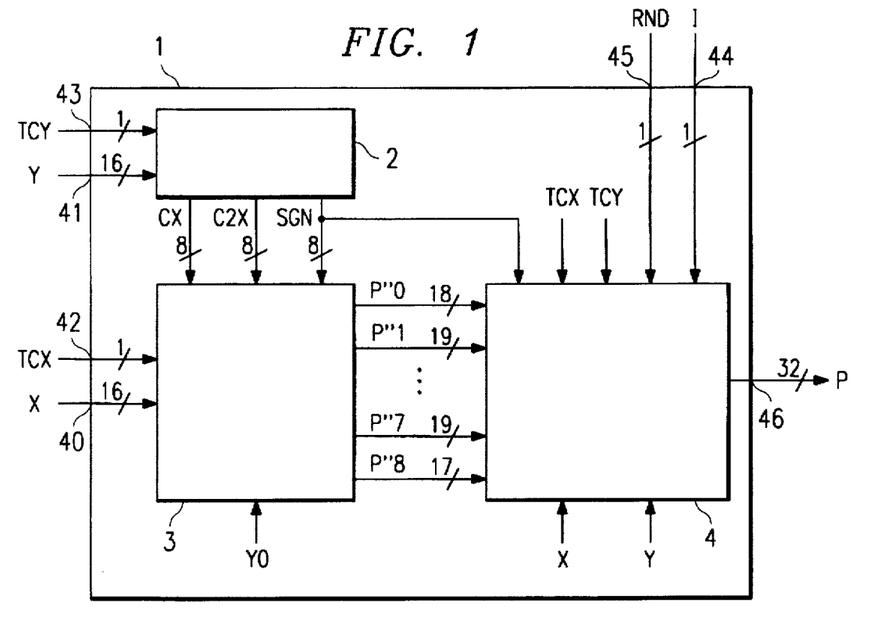
FIG. 1 is a block diagram of a logic multiplication circuit according to the invention.

The FIG. 1 shows a logic multiplication circuit 1. This circuit comprises:

- two parallel input terminals 40 and 41 to receive a first and second series of n logic signals $X=(X_{15}, X_{14}, \ldots, X_1, X_0)$ and $Y=(Y_{15}, Y_{14}, \ldots, Y_1, Y_0)$ representing two binary data elements $X_d=(x_{d,15}, x_{d,14}, \ldots, x_{d,1}, x_{d,0})$ and $Y_d=(y_{d,15}, y_{d,14}, \ldots, y_{d,1}, y_{d,0})$ encoded on n bits, n being an integer equal to sixteen in the example described,

- a parallel output terminal 46 to give a series $P=(P_{31}, P_{30}, \ldots, P_1, P_0)$ of thirty-two output logic signals representing an output binary data element $P_d=(p_{d,31}, p_{d,30}, \ldots, p_{d,1}, p_{d,0})$ encoded on thirty-two bits with $P_d$ representing the result of the logic multiplier $X_d*Y_d$,

- a Booth decoder 2 producing three series referenced CX, C2X and SGN with eight logic selection signals respectively referenced CX1 to CXS, C2X1 to C2X8, and SGN1 to SGNS,

- a partial product generator 3 producing nine series of intermediate logic signals P"0 to P"8,

- a computation and formatting circuit 4 receiving the series of intermediate signals and producing the series of output signals P,

- four input terminals 42, 43, 44, 45 to receive four control signals referenced TCX, TXY, I and RND respectively.

A logic signal will be typically at 0 volts if it represents a bit equal to 0 and at 3 (or 5) volts if it represents a bit equal to 1.

In the example described, the circuit considered is a circuit delivering an integer or fractional type result (with I in the state 1 or 0), that may or may not be rounded out (RND in the state 1 or 0) and may or may not be signed (TCX and/or TCY in the state 1 or 0).

Figure 3:
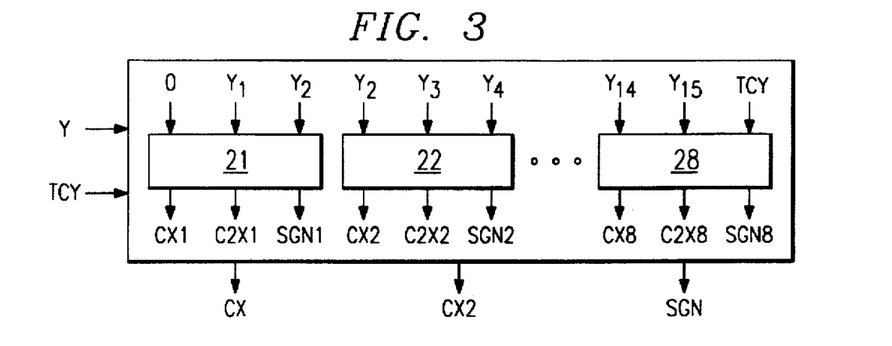
FIG. 3 is a block diagram of a decoding circuit.

FIG. 3 illustrates the Booth decoder 2. This decoder receives the series of signals Y and the signal TCY at two inputs and gives the series CX, C2X and SGN at three outputs. It has eight decoding cells 21 to 28 which are not all shown with three inputs and three outputs.

In the example described, the following decoding formula is used:

$$Y_d = Y_{d,0} * 2^0 + [(0 + y_{d,1} - 2 * y_{d,l+1} = \\ *2^j]_{j=1} + \Sigma_j (y_{d,j-1} + y_{d,j} - 2 * y^{d,j+1}) * 2^j,$$
$j$ index of 3 to 15.

This makes it possible to consider a multiplier that is encoded in signed or unsigned arithmetic while at the same time limiting the number of decoding cells to eight (=n/2) and considering $y_{d,16}$ identically equal to TCY.

The cells 21 to 28 respectively receive, at their inputs, the signals 0 (potential of a ground), $Y_1$ and $Y_2$ for the first cell 21, $Y_2$, $Y_3$ and $Y_4$ for the second cell 22, ..., $Y_{14}$, $Y_{15}$ and TCY for the last cell 28. At their outputs, they respectively give the signal CX1, C2X1 and SGN1 for the first cell 21, ..., CX8, C2X8 and SGN8 for the last cell 28 so that, for j as an index from 1 to 8:

- (CXj, C2Xj, SGNj)=(0, 0, 0) if the signals received at input are all in state 0 or all in the state 1,
- (CXj, C2Xj, SGNj)=(1, 0, 0) if the first or second signal received at input is in the state 1 and the third signal is in the state 0,
- (CXj, C2Xj, SGNj)=(1, 0, 1) if the third signal and the first or second signal received at input are in the state 1,
- (CXj, C2Xj, SGNj)=(0, 1, 0,) if the first and second signals received at input are in the state 1 and the third signal is in the state 0,
- (CXj, C2Xj, SGNj)=(0, 1, 1) if the first or second signal received at input is in the state 1 and the others are in the state 0.

Functionally, it is possible to consider nine decoding cells, with the circuit 1 working as if there were a ninth decoding cell producing selection signals (CX0, C2X0, SGN0), with (CX0, C2X0, SGN0)=($Y_0$, 0, 0).

Figure 4:
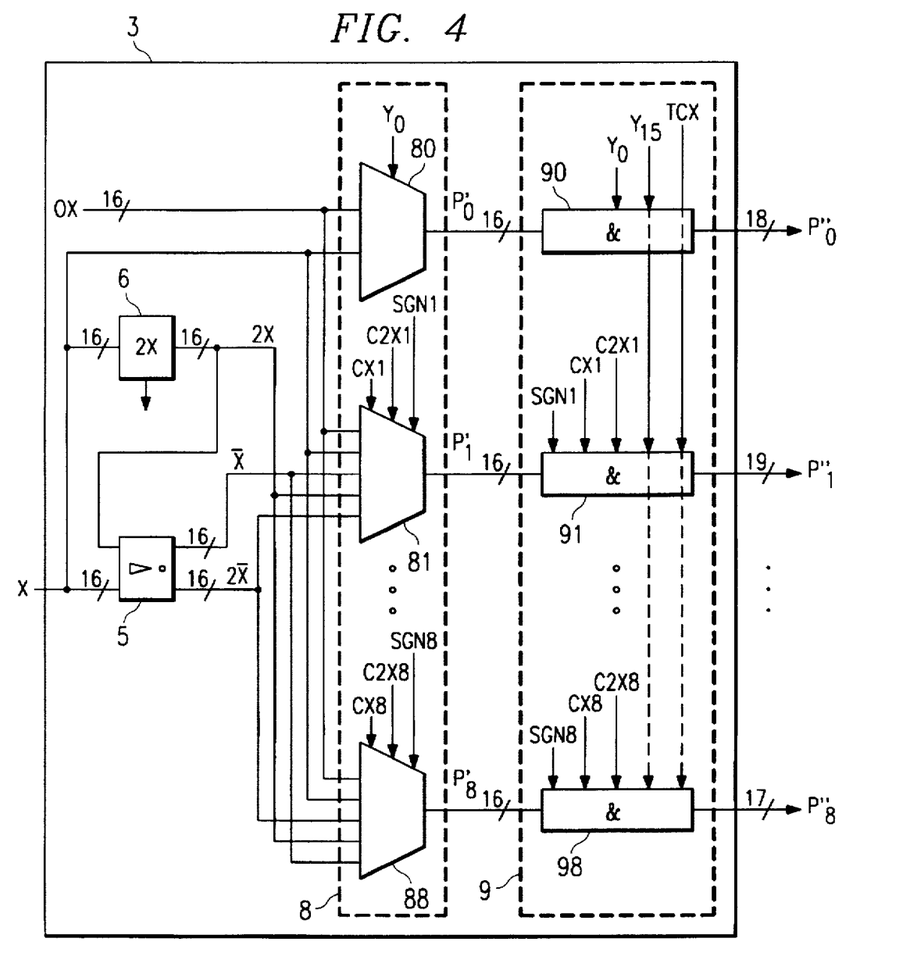
FIG. 4 is a block diagram of a partial product generator circuit.

FIG. 4 illustrates the partial product generator 3.

This generator 3 comprises:

- inputs to receive the series X, CX, C2X, SGN and the signals $Y_0$(which plays the role, in this circuit, of a selection signal) and TCX,

- a leftward shift circuit 6 producing a third series of sixteen signals $2X=(X_{14}, X_{13}, \ldots, X_0, 0)$ by a leftward shift of the first series of signals X,

- an inversion circuit 5 producing a fourth and fifth series of 16 signals $/X=(/X_{15}, /X_{14}, \ldots, /X_1, /X_0)$ and $/2X=(/X_{14}, /X_{13}, \ldots, /X_0, 1)$ by inversion of the first and third series of signals X and 2X, this inversion circuit being made, in practice, by the placing of two series of sixteen inverters in parallel,

- a multiplexing circuit 8 receiving the first, third, fourth, fifth and a sixth series, referenced of sixteen signals with constant logic states 0, this multiplexing circuit also receiving the series of selection signals and the signal $Y_0$ and, by the action of these signals, producing nine series of sixteen derived signals P'0 to P'8 such that each series of derived signals is equal to one of the five series of signals (0X, X, /X, 2X, /2X) received by the multiplexer circuit 8,

- a sign extension circuit 9 producing nine series of sign extension signals by the action of the series of selection signals and comprising nine concatenation circuits 90 to 98, not all represented, to produce the nine series of intermediate signals P"0 to P"8 by concatenation of one of the nine series of derived signals and one of the nine series of sign extension signals.

The leftward shift circuit 6 is formed for example by a parallel register with seventeen inputs and seventeen outputs. This register receives on sixteen of its inputs ($X_{15}$, $X_{14}$, . . . , $X_1$, $X_0$) and has its last input connected to a ground (logic state 0). On sixteen of its outputs 2X, it gives the output corresponding to the receiving input. $X_{15}$ is unusable. In practice, the register is virtual, since everything comes down to a problem of wiring.

The multiplexing circuit 8 has nine multiplexers 80 to 88, not all of which are shown.

The first multiplexer 80 has a first input and a second input that are parallel and respectively receive the series 0X and X, a control input receiving the signal $Y_0$ and gives, at a parallel output, the derived series P'0 such that the output is connected to the first input if $Y_0$ is in the state 0 and such that it is connected to the second input if $Y_0$ is in the state 1. In practice, it is possible to make an equivalent circuit from the functional viewpoint by using sixteen AND gates and two parallel inputs, each receiving the signal $Y_0$ and one of the signals $X_0$ to $X_{15}$ at input.

Each of the multiplexers 81 to 88 has:

five parallel inputs to receive the series 0X, X, /X, 2X and /2X, three control inputs to respectively receive the triplets of signals (CX1, C2X1, SGN1) to (CX8, C2X8, SGN8), and a parallel output to give a derived series (P'1=($P'_{1,15}$, . . . , $P'_{1,0}$) to P'8=($P'_{8,15}$, . . . , $P'_{8,0}$)) respectively connected to one of its inputs according to the state of the selection signals received (the input receiving the series 0X if the triplet of selection signals is in the state (0, 0, 0), the input receiving the series X if the triplet is in the state (1, 0, 0), the input receiving /X if the triplet is in the state (1, 0, 1), the input receiving 2X if the triplet is in the state (0, 1, 0), the input receiving 2X if the triplet is in the state (0, 1, 1)).

The derived series $P'_0$ to $P'_8$ represent binary data element $P'_{d,0}$ to $P'_{d,8}$ such that:

$$P'_{d,0} = X * y_{d,0} * 2^0$$
$$P'_{d,1} = X * |y_{d,1} - 2 * y_{d,2}| * 2^1 =$$

$(0X \text{ or } X \text{ or } 2X) * 2, X * |y_{d,1} - 2 * y_{d,2}| * 2^1 = /X * 2, \text{ or } (/X =$ $|y_{d,1} - 2 * y_{d,2}| + 1) * 2^1 = /2X * 2$, $$P_{d,2} = X * |y_{d,2} + y_{d,3} - 2 * y_{d,4}| * 2^3,$$

$/X * |y_{d,2} + y_{d,3} - 2 * y_{d,4}| * 2^3$, or $(/X * |y_{d,2} + y_{d,3} - 2 * y_{d,4}| + 1) * 2^3$, . . . , $$P_{d,7} = X * |y_{d,12} + y_{d,13} - 2 * y_{d,14}| * 2^{13},$$

$/X * |y_{d,12} + y_{d,13} - 2 * y_{d,14}| * 2^{13}$, or $(/X * |y_{d,12} + y_{d,13} - 2 * y_{d,14}| + 1) * 2^{13}$, $$P_{d,8} = X * |y_{d,14} + y_{d,15} - 2 * tcy| * 2^{15},$$

$/X * |y_{d,14} + y_{d,15} - 2 * tcy| * 2^{15}$, or $(/X * |y_{d,14} + y_{d,15} - 2 * tcy| + 1) * 2^{15}$, with tcy=0 if the signal TCY is in the state 0 and tcy=1 if TCY is in the state 1.

The sign extension circuit 9 receives the derived series P'0 to P'8, each series being given to a concatenation circuit (respectively referenced 90 to 98) which furthermore receives the signals $X_{15}$ and TCX and respectively the signals $Y_0$ as regards the circuit 90, and (CX1, C2X1, SGN1) to (CXS, C2X8, SGNS) as regard the circuits 91 to 98.

Each of the concatenation circuits produces a series of intermediate signals (referenced P'0 to P'8 ), by concatenation of one of the series of derived signals and of a series of sign extension signals, such that:

P"0=($P"_{0,17}$, . . . , $P"_{0,0}$)=(0, 1, $P'_{0,15}$, . . . , $P'_{0,0}$) if TCX=$Y_0$=$X_{15}$=1, and P"0=(1, 0, $P'_{0,15}$, . . . , $P'_{0,0}$) else.

for j as an index from 1 to 7:

P"j=($P"_{j,18}$, . . . , $P"_{j,0}$)=(0, 1, 1, $P'_{j,15}$, . . . , $P'_{j,0}$) if (CXj, C2Xh, SGNj)=(0, 0, 0),

P"j=(0, 1, 1, $P'_{j,15}$, . . . , $P'_{j,0}$) if (CXj, C2Xj, SGNj)=(1, 0, 0) and TCX=0, P"j=(0, 1, 0, $P'_{j,15}$, . . . , $P'_{j,0}$) if (CXj, C2Xj, SGNj)=(1, 0, 1) and TCX=0, P"j=($X_{15}$, $/X_{15}$, $/X_{15}$, $P'_{j,15}$, . . . , $P'_{j,0}$) if (CXj, C2Xj, SGNj)=(0, 1, 0) and TCX=0, P"j=(0, $/X_{15}$, $X_{15}$, $P'_{j,15}$, . . . , $P'_{j,0}$) if (CXj, C2Xj, SGNj)=(0, 1, 1) and TCX=0, P"j=(0, 1, $X_{15}$, $P'_{j,15}$, . . . , $P'_{j,0}$) if (CXj, C2Xj, SGNj)=(1, 0, 0) or (0, 1, 0) and TCX=1, P"j=(0, 1, $X_{15}$, $P'_{j,15}$, . . . , $P'_{j,0}$) if (CXj, C2Xj, SGNj)=(1, 0, 1) or (0, 1, 1) and TCX=1, for P"8:

P"=($P"_{8,16}$, . . . , $P"_{8,0}$)=(1, $P'_{8,15}$, . . . , $P'_{8,0}$) if (CX8, C2X8, SGN8)=(0, 0, 0) or
(CX8, C2X8, SGN8)=(1, 0, 0) and TCX=0.

P"8=(0 $P'_{8,15}$, . . . , $P'_{8,0}$) if (CX8, C2X8, SGN8)=(1, 0, 1) and TCX=0, P"8=($/X_{15}$, $P'_{8,15}$, . . . , $P'_{8,0}$) if
(CX8, C2X8, SGN8)=(0, 1, 0) and TCX=0 or
(CX8, C2X8, SGN8)=(1, 0, 0) or (0, 1, 0), and TCX=1.

P"8=($X_{15}$, $P'_{8,15}$, . . . , $P'_{8,0}$)if
(CX8, C2X8, SGN8=(0, 1, 1) and TCX=0, or
(CXS, C2X8, SGN8=(1, 0, 1) or (0, 1, 1), and TCX=1.

The intermediate series represent binary data known as partial products, encoded on thirty-two bits. Each signal of an intermediate series represents a bit, with a given position, of a partial product. The intermediate series comprise a maximum number of nineteen signals, corresponding to the variable value bits of the partial product that they represent. The other bits have a constant value equal to 0 and therefore do not play a role in the result of the addition of the partial products.

With regard to the intermediate series P'8 , it has only one signal more than the series P'8 because the series P'8 represents bits, with a place value 15 to 30, of a binary data element and $P'_{d,8}$=($0*2^{31}$, $X_{15}*|y_{d,14}+y_{d,15}-2*tcy|*2^{30}$, . . . $X_0=|y_{d,14}+y_{d,15}-2*tcy|*2^{15}$, $0*2^{14}$, . . . $0*2^0$), $0*2^{31}/X_{15}*|y_{d,14}-+y_{d,15}2*tcy|*2^{30}$, . . . $/X_0*|Y_{d,14}+Y_{d,15}-2*tcy|*2^{15}$, $0*2^{14}$, . . . , $0*2^0$), or ($0*2^{31}$, $(/X_{15}*|y_{d,14}+y_{d,15}-2*tcy|+1)*2^{30}$, . . . , $(/X_0*|y_{d,14}+y_{d,15}-2*tcy|+1)*2^{15}$, $0*2^{14}$, . . . , $0*2^0$), if we consider the binary data elements on thirty-two bits.

As compared with a conventional multiplication circuit using the Booth decoding system, the circuit 1 has the advantage of limiting the maximum number of sign extension signals per intermediate series to three. Without reducing the number of sign extension signals as described here above, the intermediate series P"0 would have had thirty-two signals (instead of the eighteen in the invention), and the series P'1 would have had thirty-one signals (instead of nineteen in the invention), etc.

Figure 5:
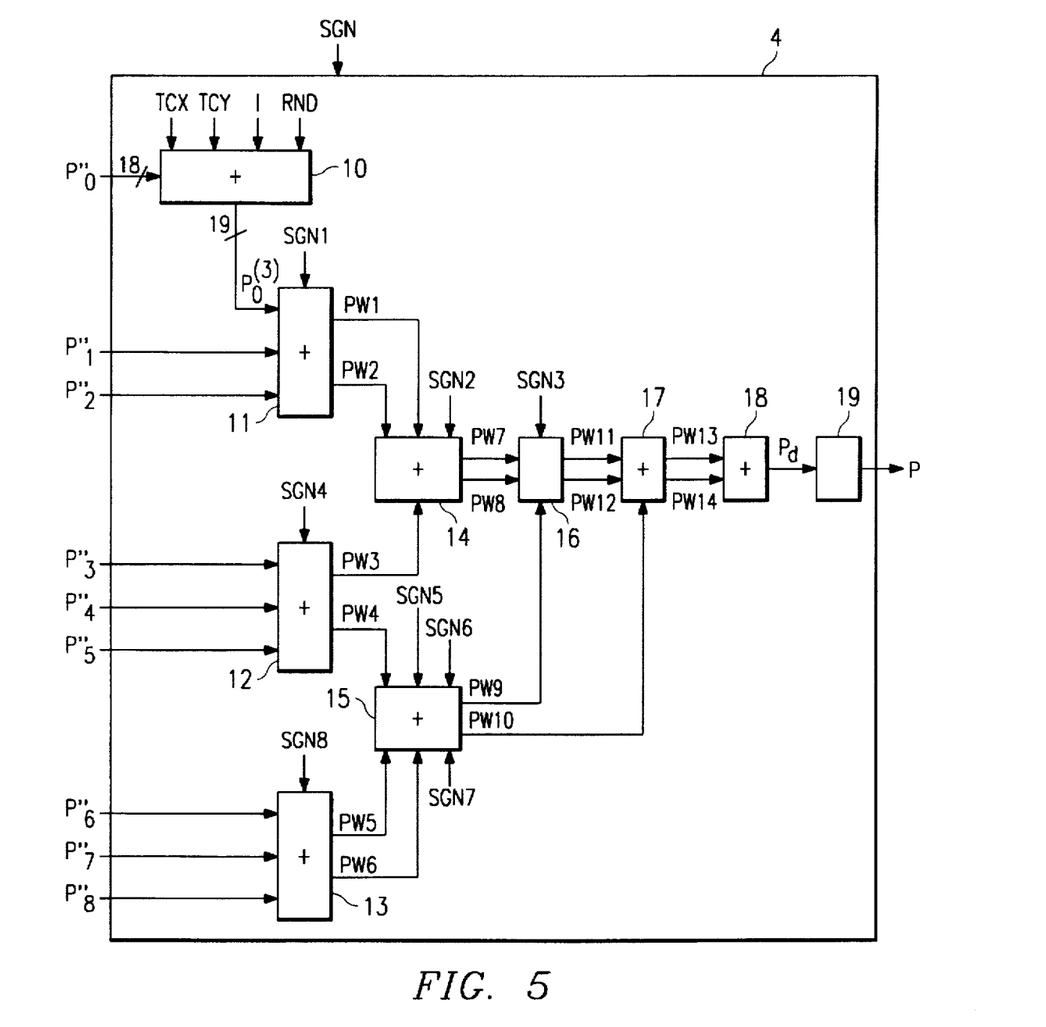
FIG. 5 is a block diagram of a computing and formatting circuit.

FIG. 5 illustrates the computation and formatting circuit 4.

The circuit 4 receives:
- the control signals TCX, TCY, I, RND,
- the first and second series X and Y,
- the intermediate series P'0 to P'8, and
- the series of selection signals SGN.

This circuit has seven addition circuits 11 to 17 receiving three series of input signals and producing two series of output signals, and a final addition circuit 18 receiving two series of input signals and producing a series of output signals, the addition circuits being formed by parallel-mounted elementary adders, herein of the Carry Save Adder (CSA) type with three inputs and two outputs.

Each series of input signals received by each addition circuit 12 to 18 is either one of the series of intermediate signals or a series of output signals produced by another addition circuit, and the addition circuits form a parallel structure called a Wallace tree.

The computation circuit 4 furthermore comprises an incrementation circuit 10 receiving at input the intermediate series P"$_0$, the signals TCY, TCX, I and RND. At one output, this incrementation circuit gives a series of input signals $P^{(3)}0$ such that the series $P^{(3)}0$ comprises nineteen signals $P^{(3)}_{0,18}$ to $P^{(3)}_{0,0}$ with:

$P^{(3)}_{0,j} = P'_{0,j}$ for j from 0 to 13, if RND=0 then:
$(P^{(3)}_{0,18}, P^{(3)}_{0,17}, P^{(3)}0,16, P^{(3)}0,15, P^{(3)}_{0,14}) = (0, P"_{0,17}, P"_{0,16}, P"_{0,15}, P"_{0,14})$.

if TCX=TCY=/I=RND=1 then:
$(P^{(3)}_{0,18}, P^{(3)}_{0,17}, P^{(3)}_{0,16}, P^{(3)}_{0,15}, P^{(3)}_{0,14}) = (P"_{0,17}, P"_{0,16}, P"_{0,15}, P"_{0,14}) + (0, 0, 0, 1)$ with + the binary addition and $P^{(3)}_{0,18}$ the carry of the addition, if RND=1 and I=1 or (TCX or TCY =0) then:

$$(P^{(3)}_{0,18}, P^{(3)}_{0,17}, P^{(3)}_{0,16}, P^{(3)}_{0,15}, P^{(3)}_{0,14}) = (P"_{0,17}, P"_{0,16}, P"_{0,15}, P"_{0,14}) + (0, 0, 1, 0).$$

It is assumed here that the result of the multiplication is not rounded with a shift if the integer type operands (I=1) are considered.

The aim of this incrementing device 10, should it be desired to have a rounded type of result, is to anticipate the possible incrementation that usually results from the formatting of the output series in order to round this incrementation.

It can be seen that the series of signals received by the incrementation circuit 10 is, one the one hand, one of the series of intermediate signals having the smallest number of signals and, on the other hand, a series whose signals represent the least significant bits, in representation on thirty-two bits.

From an arithmetical viewpoint, this amounts to limiting a propagation of carry to the minimum. The incrementation circuit 10 may also receive at input a series of output signals produced by one of the addition circuits. In practice, instead of setting up an incrementation on sixteen bits in the formatting circuit, the structure is limited to an incrementation circuit on four bits in the Wallace tree.

It will be furthermore observed that this is a conditional incrementation since it is assumed here that there is a leftward shift or no leftward shift of the final series produced by the addition circuits depending on whether or not the operands are signed in fractional mode.

In the Wallace tree, in order to minimize the size of the circuit, it is preferable to carry out the processing, in each addition circuit, of the input series corresponding to neighboring groupings in the Booth decoding (namely series representing binary data elements such that, if the bits of these data elements that are not identical in the state 0 are called bits that represent these data elements, the between t between the least significant bit and the most significant bit of the set of representative bits is as small as possible).

Thus, if we consider the decoding formula $Y_d = y_{d,0}^{20} + [(0 + y_{d,j} - 2 \cdot y_{d,j+1}) \cdot 2^{j}]_{j=1} + \Sigma_j (y_{d,j-1} + y_{d,j} - 2 \cdot y_{d,j+1}) \cdot 2^j$, the series $P^{(3)}_0$ will represent a data element encoded on nineteen representative bits with positional values of 0 to 18, the series P'1 will represent a data element encoded on nineteen representative bits with positional values of 1 to 19, the series P'2 will represent a data element encoded on nineteen representative bits with positional values of 3 to 21, etc., and the addition circuit 11 (illustrated in FIG. 6) receiving these three series at input will have nineteen elementary adders since at least two of these series represent data elements encoded on representative bits with positional values of 1 to 19.

With regard to the reduction of the number of intermediate series the type of elementary adder will be chosen as a function of the number of bits on which are encoded the operands whose first and second series are representative. It is possible to use adders with three inputs and two outputs five or seven inputs and three outputs etc., knowing that the greater the number of inputs and outputs possessed by the CSA device, the longer is the time taken to go through it. In practice, if the operands $X_d$ and $Y_d$ are encoded on sixteen bits, the structure chosen will preferably be a structure based on adders with three inputs and two outputs, which implies four steps of the reduction:

- of the nine series of signals, $P^{(3)}0$ and P"1 to P'8, to six series of signals PW1 to PW6 (addition circuits 11, 12 and 13),
- of the six series of signals, PW1 to PW6, to four series of signals PW7 to PW10 (addition circuits 14 and 15),
- of three of the four series of signals (PW7 to PW9) to two series of signals PW11 and PW12 (addition circuit 16),
- of the two series of signals produced at the previous step PW11 and PW12 and of the last of the four series of signals produced at the second step (PW10) to two series of signals PW13 and PW14 (addition circuit 17),
- of these two latter series PW13 and PW14 to one final series of signals Pf (addition circuit 18).

Each elementary carry save adder receives three logic signals A, B, D at input and gives two logic signals S and C at output such that S=A^B^D, and C=C(A, B, D)=(A.B)+D. (A^B), with +representing a logic OR, ^ representing a logic exclusive OR and representing a logic AND.

As has been seen, the signals of the series of signals represent bits of binary data having different place positional values. Owing to the decoding chosen, the input series of the addition circuits will be somewhat shifted with respect to one anther. Thus, the series of signals P'1 is formed by signals representing bits with positional values of 1 to 19, the series of signals P'2 is formed by signals representing bits with positional values of 3 to 21 etc. and only the series $p^{(3)}0$ comprises a signal representing a bit with a positional value 0.

Consequently, the elementary adders will not obligatorily have all their inputs receiving a signal of an input series of signals.

Figure 6:
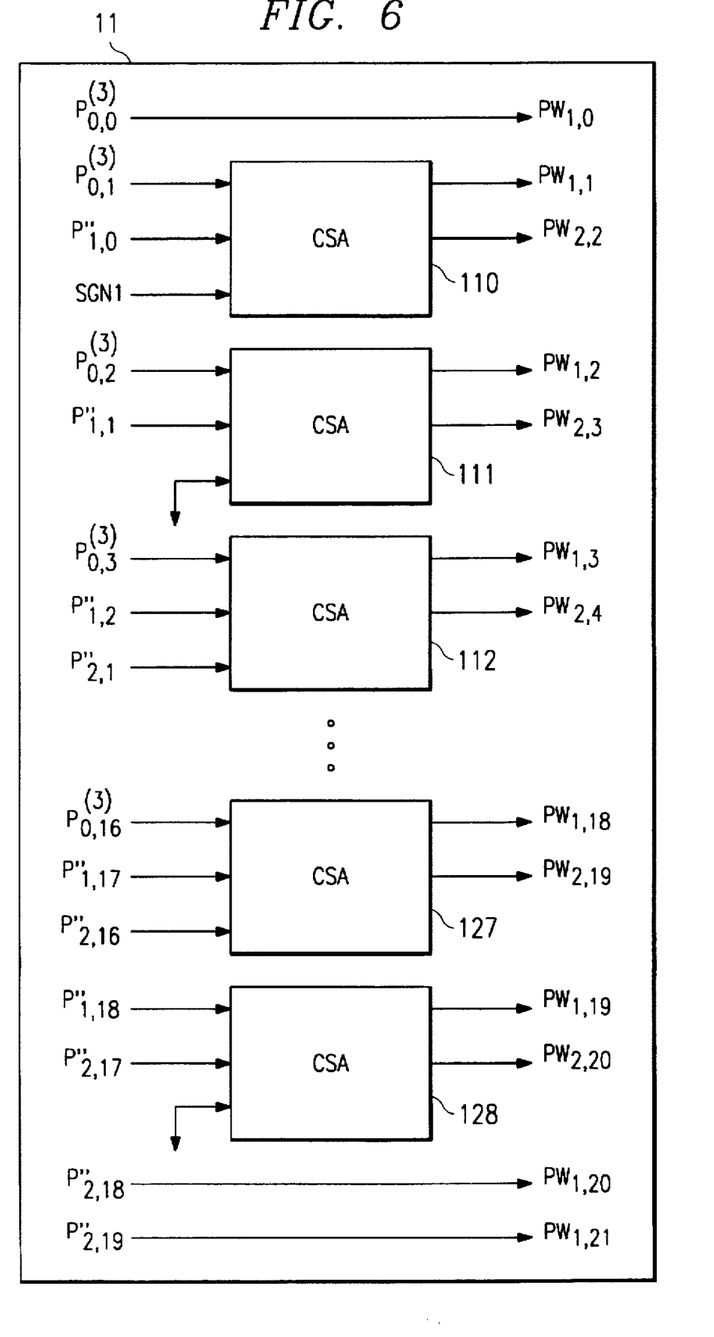
FIG. 6 is a block diagram of an addition circuit.

Thus, the addition circuit 11 illustrated in FIG. 6 by way of an example, receives the following at input:

the series $P^{(3)}0=(P^{(3)}_{0,18}, \ldots, P^{(3)}_{0,0})$, the series $P"1=(P"_{1,19}, \ldots, P"_{1,0})$ and the series $P"2=(P"_{2,19}, \ldots, P"_{2,0})$, and gives two series of outputs $PW1=(PW_{1,21}, \ldots, PW_{1,0})$ and $PW2=(PW_{2,18}, \ldots, PW_{2,0})$.

If the operation had entailed obtaining the two's complement of the partial products in the partial product generator, we would have had:

$PW_{1,0}=P^{(3)}_{0,0}$, $PW_{1,1}=P^{(3)}_{0,1}{}^{\wedge}P"_{1,0}=P^{(3)}_{0,1}{}^{\wedge}P"_{1,0}{}^{\wedge}0$, $PW_{2,0}=C(P^{(3)}_{0,1}, P"_{1,0}, 0)$ $PW_{1,2}=P^{(3)}_{0,2}{}^{\wedge}P"_{1,1}=P^{(3)}_{0,2}{}^{\wedge}P"_{1,1}{}^{\wedge}0$, $PW_{2,1}=C(P^{(3)}_{0,2}, P"_{1,1}, 0)$ $PW_{1,3}=P^{(3)}_{0,3}{}^{\wedge}P"_{1,2}{}^{\wedge}P"_{2,1}$, $PW_{2,2}=C(P^{(3)}_{0,3}, P"_{1,2}P"_{2,1})$ etc.

with $P^{(3)}0$, $P"1$, and $P"2$ formed out of series $P'0$, $P'1$ and $P'2$ representing binary data elements of the form $+K*X_d*2^i$ where $-K*X_d*2^i$, with K as a natural integer (K=0, 1 or 2 with the decoding implemented in the invention). This implied the presence of incrementing devices in the partial product generator to produce series representative of $-K*X_d$.

Now, it appears that the inputs of the elementary adders are not all used to receive a variable signal, the unused inputs being connected in practice to the ground.

In the invention, this state of affairs is taken advantage of in order to carry the incrementation into the addition circuit. Thus, the addition circuit 11 receives the signal SGN1 representing the sign assigned to K according to the decoding, in such a way that we have:

$- PW1 = (PW_{1,21}, \ldots, PW_{1,0}) = (P"_{2,19}, P"_{2,18}, P"_{1,18} P"_{2,17}, P"_{1,17} P"_{2,16} P^{(3)}_{0,18}, \ldots, P^{(3)}_{0,3} P"_{1,2} P"_{2,1}, P^{(3)}_{0,2} P"_{1,1}, P^{(3)}_{0,1}, P"_{1,0} SGN1, P^{(3)}_{0,0})$, and $- PW2 = (PW_{2,18}, \ldots, PW_{2,0}) = (C(P"_{1,18}, P"_{2,17}, 0), C(P"_{1,17}, P"_{2,16}, P^{(3)}_{0,18}), \ldots, C(P^{(3)}_{0,2},P"_{1,2}, P"_{2,1}), C(P^{(3)}_{0,2}, P^{(3)}_{1,1}, 0) C(P^{(3)}_{0,1}, P"_{1,0}, SGN1))$.

The addition circuit 11 has nineteen adders 110 to 128, the adder 110 receiving the signals $P^{(3)}_{0,1}$, $P"_{1,0}$, and SGN1 and giving the signals $PW_{1,1}$ and $PW_{2,2}$, etc.

It will be seen that, without reducing the number of sign extension signals, the addition circuit 11 could have had thirty-one elementary adders Similarly, depending on the availability of the inputs of their adders, the addition circuits 12 to 16 will receive one or more of the signals SGN2 to SGN8.

Figure 7:
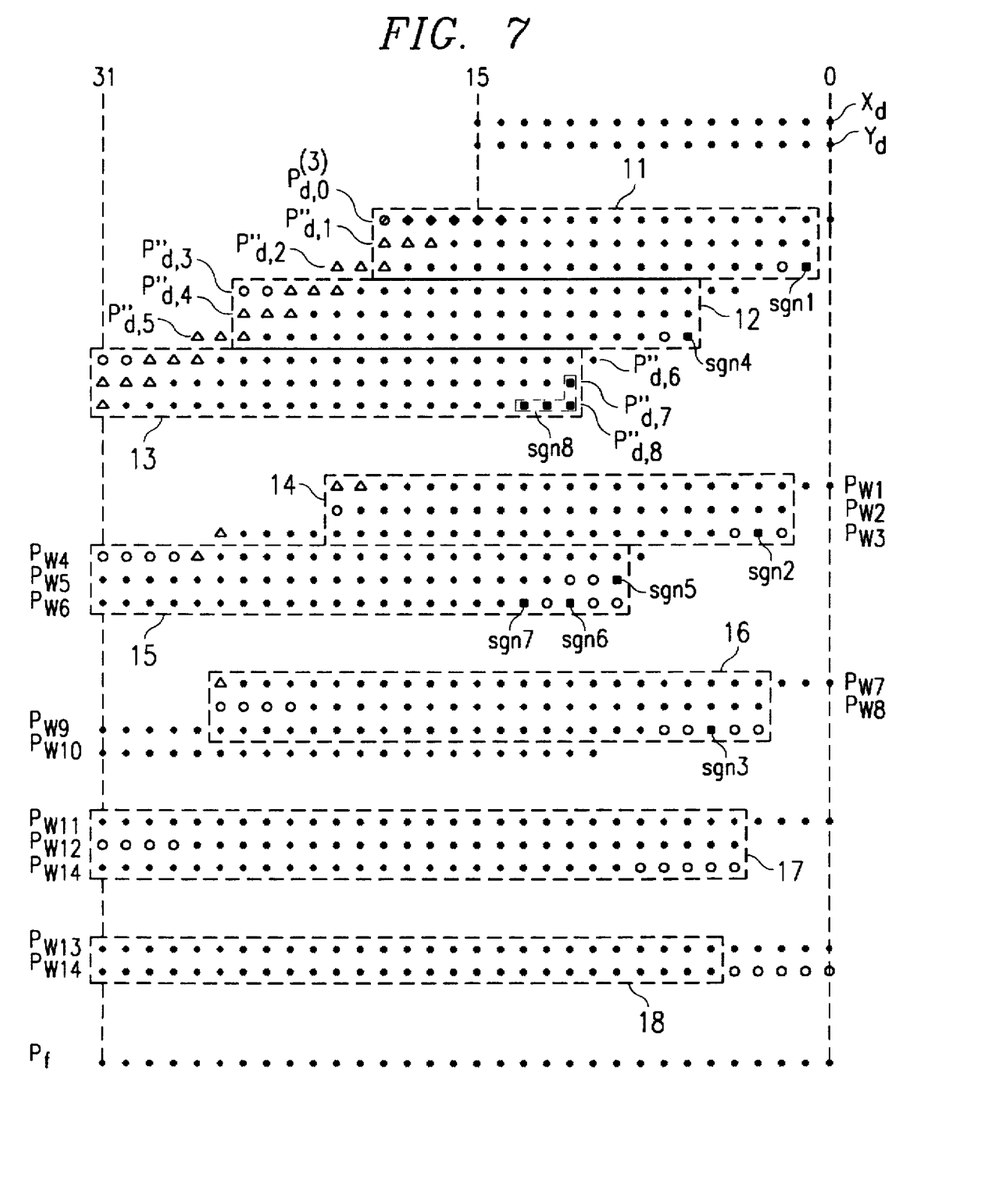
FIG. 7 is a diagram symbolically showing the progress of a processing operation in the computation and formatting circuit.

With regard to the rest of the addition circuits, to make them it is enough to refer to FIG. 7 which illustrates the different steps used to produce the series Pf of thirty-two signals representing a binary data element equal to the sum of the binary data elements present at the input of the addition circuits, and in which:

the dots represent bits of variable value, the triangles represent sign extension bits, the zeros represent bits with a value 0, the diamonds represent bits modified by the incrementation in the rounding function, the squares represent bits sgn1 to sgn8 whose value depends on the state of the selection signals SGN1 to SGN8, the rectangles demarcated by hatched lines and numbered 11 to 18 show the bits whose representative signals are processed in the elementary adders of the addition circuits and the circuit in which these signals are processed.

It will be observed that as regards the partial product $P"_{d,8}$, it is not possible, in the structure described, to carry out a incrementation, if the case arises, by giving the signal SGN8 to a single input of an elementary adder. Indeed, the signals from P"8 are representative, among the different intermediate series, of the most significant bits. The procedure therefore in the case of P"8 will be to give SGN8 to all the adder inputs of the addition circuit 13 that normally receive a constant logic signal 0 (by connection to the ground) representing least significant bits.

Furthermore, it will be observed that, in practice, if, of the input signals received, signals representing bits with positional values are the only signals representing bits with such positional values, then these signals will not be processed in adders since $A^{\wedge}0^{\wedge}0=A$ and $(A.0)+0.(A^{\wedge}0)=0$. Thus, $P^{(3)}_{0,0}$ for example is found as such in the series Pf.

In the exemplary embodiment described, the possible incrementation of the partial products is carried into the Wallace tree by giving the signals SGN1 to SGN8 directly to the adder inputs. This is of course a special case aimed at facilitating the understanding of the invention. It could have been possible to speak more generally of incrementation signals produced out of the selection signals. However, by describing the case where the selection signals are given directly to adder inputs, a possible ambiguity, arising out of the fact that the signals of the series of intermediate signals depend on the selection signals, is removed.

The essential point is to give signals representing the incrementation. It is quite possible for example to produce signals SGN1 to SNG8 in the decoding cells such that they are in the state 1 if, representatively, the partial products have the same sign as the multiplicand or else in the state 0 and to invert these signals subsequently before giving them to the adders.

With regard to the addition circuit 18, it would not be worthwhile to use a series adder with carry propagation for reasons of speed but rather to use a parallel type adder. The element used will preferably be a carry selection adder of the Brent & Kung type. The carry selection adders are the most compact ones. Brent & Kung type adders are faster but also bulkier.

The addition circuit 18 produces the series of thirty-two signals $Pf=(Pf_{31}, Pf_{30}, \ldots, Pf_1, Pf_0)$. This series is given to a formatting circuit 19 enabling the production of the output series $P=(P_{32}, P_{30}, \ldots, P_1, P^0)$.

Figure 2:
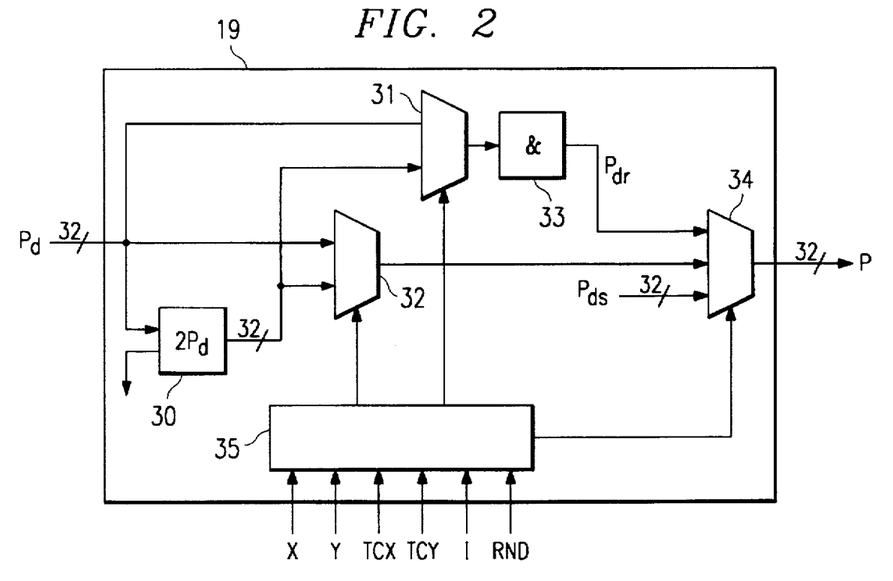
FIG. 2 is a block diagram of a formatting circuit.

This circuit 19 schematically has:

a leftward shift register 30 similar to the circuits 6 and 7 of FIG. 3, producing a series $2Pf=(Pf_{30}, Pf_{29}, \ldots, Pf_0, 0)$.

two multipliers 31 and 32, each with two inputs, each receiving the series Pf and 2Pf, a concatenation circuit 33 receiving the series present at output of the multiplexer 31 (Pf or 2Pf) and producing a series of 32 signals $Pfr=(Pf_{31}, Pf_{30}, \ldots, Pf_{15}, 0, \ldots, 0)$ or $(Pf_{30}, Pf_{29}, \ldots, Pf_{14}, 0, \ldots, 0)$, a multiplexer 34 receiving, at three inputs respectively, the series Pfr, the series (Pf or 2Pf) present at output of the multiplexer 32 and a series of 32 signals $Pfs=(0, 1, 1, \ldots, 1)$ called saturation signals such that conventionally P=Pfs if $X=Y=(1, 0, 0, \ldots, 0)$ in fractional arithmetic with signed operands (TCX=TCY=/I=1), a logic control circuit 35 receiving the series X, Y, and the signals TCX, TCY, I, RND and giving control signals to the multiplexer 31, 32, and 34 of the formatting circuit as a function of the type of result desired (integer, fractional, rounded, etc.).

Although the invention has been described with reference to a preferred exemplary embodiment, it will be understood that this example is not restrictive and that various variants can be applied to it without departing from the scope of the invention.

What is claimed is:

1. A parallel multiplication logic circuit receiving first and second n-bit logic signals, representing a multiplicand and a multiplier, and producing 2*n output logic signals representing an output binary data element encoded on 2*n bits, comprising:
    a circuit producing logic selection signals from the second signals;
    a partial product generator producing intermediate logic signals by the combination of the first signals and of the selection signals;
    a computation and formatting circuit receiving the intermediate signals and producing the output signals;
    wherein the computation circuit comprises an incrementation circuit to produce input signals from signals received by this incrementation circuit by the modification, through the action of the control signals received by the logic circuit, of the signals received, as a function of at least one control signal received by the logic circuit which are representative of formats of said first and second signals and said output logic signals.

2. A circuit according to claim 1, wherein the signals received by the incrementation circuit is one of the intermediate signals.

3. A circuit according to claim 2, wherein the signals received by the incrementation circuit is one of the intermediate signals produced by the combination of the first signals and of a signal of the second signals.

4. A circuit according to claim 1, wherein the computation circuit comprises addition circuits receiving input signals and producing output signals, the addition circuits being formed by elementary adders with several parallel-connected inputs, each adder receiving, at one input, at least one signal of the input signals.

5. A circuit according to claim 4, wherein one of the signals received by the incrementation circuit is one the output signals produced by the addition circuits.

6. A circuit according to claim 4, wherein elementary adders of all the addition circuits receive one of the selection signals at one input.

7. A circuit according to claim 4, wherein one of the input signals received by the addition circuits is the signals that are produced by the incrementation circuit.

8. A circuit according to claims 4, wherein the addition circuits form a structure known as a Wallace tree.

9. A circuit according to claims 1, wherein the circuit producing the logic selection signals is a Booth decoder.

10. A parallel multiplication logic circuit receiving first and second n-bit logic signals, representing a multiplicand and a multiplier, and producing 2*n output logic signals representing an output binary data element encoded on 2*n bits, comprising:
    a circuit producing logic selection signals from the second signals;
    a partial product generator producing intermediate logic signals by the combination of the first signals and of the selection signals;
    a computation and formatting circuit receiving the intermediate signals and producing the output signals;
    wherein the computation circuit comprises an incrementation circuit to produce input signals from signals received by this incrementation circuit by the modification, through the action of the control signals received by the logic circuit, of the signals received;
    wherein the partial product generator comprises:
        a leftward shift circuit producing third signals by the leftward shift of the first signals;
        an inversion circuit producing fourth and fifth signals by the inversion of the first and third signals;
        a multiplexing circuit receiving the first, third, fourth, and fifth signals, and sixth signals with constant logic states, this multiplexing circuit also receiving the selection signals and, through the action of these selection signals, producing derived signals such that each of the derived signals is equal to one of the five signals received by the multiplexing circuit;
        a sign extension circuit producing sign extension signals, by the action of the selection signals, and comprising concatenation circuits to produce the intermediate signals by concatenation of one of the signals derived, and of one of the sign extension signals.

11. A method for computing a binary product, comprising the steps of:
    receiving first and second n-bit logic signals, said signals representing a multiplicand and a multiplier respectively;
    producing a set of logic selection signals from said second signals;
    combining said first signals and said selection signals to produce a set of intermediate logic signals;
    processing said intermediate signals by a computation circuit to produce a set of output signals;
    wherein said computation circuit comprises at least one incrementation circuit, which to modifies one of said intermediate signals by addition of a round bit, which is positioned as a function of at least one control signal which is representative of formats of said first and second signals and said output logic signals.

12. The method of claim 11, wherein said signal received by said incrementation circuit is the combination of said first signals and of a signal of said second signals.

13. The method of claim 11, wherein said processing step comprises the step of receiving at least some of said intermediate signals into a plurality of addition circuits and producing output signals, said addition circuits being formed by elementary adders with several parallel-connected inputs, each adder receiving, at one input, at least one signal of said input signals.

14. The method of claim 13, wherein at feast one of the signals received by said incrementation circuit is one of said output signals produced by said addition circuits.

15. The method of claim 13, wherein elementary adders of all said addition circuits receive one of said selection signals at one input.

16. The method of claim 13, wherein one of said input signals received by said addition circuits is signals produced by said incrementation circuit.

17. The method of claim 13, wherein said addition circuits form a structure known as a Wallace tree.

18. The method of claim 11, wherein said step of producing a set of logic selection signals is performed by a Booth decoder.

19. A circuit comprising:
    a first series and a second series of n logic signals,
    a circuit producing logic selection signals from said second series of signals;

a partial product generator producing series of intermediate logic signals by the combination of said first series of signals and of said selection signals comprising

- a leftward shift circuit producing a third series of signals by the leftward shift of said first series of signals;
- an inversion circuit producing a fourth and a fifth series of signals by the inversion of said first and third series of signals,
- a multiplexing circuit receiving said first, third, fourth, fifth series of signals and a sixth series of signals with constant logic states, this multiplexing circuit also receiving said selection signals and, through the action of said selection signals, producing series of derived signals such that each series of derived signals is equal to one of the series of signals received by said multiplexing circuit, and
- a sign extension circuit producing series of sign extension signals, by the action of said selection signals, and comprising concatenation circuits to produce said series of intermediate signals by concatenation of one of the series of signals derived, and of one of the series of sign extension signals;

a computation and formatting circuit receiving said series of intermediate signals and producing said series of output signals;

wherein said computation circuit is connected to modify said intermediate signals according to a control signal, and comprises an incrementation circuit to produce a series of input signals from said modified intermediate signals, and addition circuits connected to receive said input signals and produce said output signals.

20. A parallel multiplication logic circuit receiving first and second n-bit logic signals, representing a multiplicand and a multiplier, and producing 2*n output logic signals representing an output binary data element encoded on 2*n bits, comprising: a circuit producing logic selection signals from the second signals; a partial product generator producing intermediate logic signals by the combination of the first signals and of the selection signals; a computation and formatting circuit receiving the intermediate signals and producing the output signals;

wherein the computation circuit comprises an addition circuit receiving at least one input signal and producing said output signal, the addition circuits being formed by elementary adders with several parallel-connected inputs, each of said adders receiving, at one input, at least one of said input signals, wherein the input signals of at least some of said addition circuits correspond to one or more said intermediate signals; and an incrementation circuit to modify one of said input signals by addition of a round bit, which is positioned as a function of at least one control signal received by the logic circuit which are representative of formats of said first and second signals and said output logic signals.

* * * * *

UNITED STATES PATENT AND TRADEMARK OFFICE
CERTIFICATE OF CORRECTION

PATENT NO. : 5,740,095

DATED : April 14, 1998

INVENTOR(S) : Philippe Parant

It is certified that error appears in the above-identified patent and that said Letters Patent is hereby corrected as shown below:

The title page should be deleted and substitute therefor the attached Title page.

In the Drawings:
    Delete Figs. 1,3 and 4 and substitute therefor FIGS. 1,3 and 4 as shown on the attached page.

| | | |
|---|---|---|
| Column 7, line 59 | Delete | "TXY" |
| | Insert | --TCY-- |
| Column 7, line 60 | Delete | "RND respectively" |
| | Insert | --RND, respectively-- |
| Column 12, line 10 | Delete | " 20 " |
| | Insert | $--2^0--$ |

Signed and Sealed this

Fifteenth Day of September, 1998

Attest:

BRUCE LEHMAN

Attesting Officer    Commissioner of Patents and Trademarks

United States Patent [19]
Parant

[11] Patent Number: 5,740,095
[45] Date of Patent: Apr. 14, 1998

[54] PARALLEL MULTIPLICATION LOGIC CIRCUIT

[75] Inventor: Philippe Parant, Biviers, France

[73] Assignee: SGS-Thomson Microelectronics, S.A., Gentilly, France

[21] Appl. No.: 501,675

[22] Filed: Jul. 12, 1995

[30] Foreign Application Priority Data

Jul. 15, 1994 [FR] France .................. 94 08950

[51] Int. Cl.⁶ .................. G06F 7/52
[52] U.S. Cl. .................. 364/760
[58] Field of Search .................. 364/760, 754, 364/757

[56] References Cited

U.S. PATENT DOCUMENTS 5,253,195  10/1993  Broker et al. .................. 364/760
5,465,226  11/1995  Goto .................. 364/760

FOREIGN PATENT DOCUMENTS 0276520  8/1988  European Pat. Off.
0545654  6/1993  European Pat. Off.

OTHER PUBLICATIONS

Richard, et al., "Fast-LSI A Second Generation Advanced Schottky Technology," Electro 84, Electronic Show and Convention, Boston, MA, pp. 9/1/1–9 (1984).

Goto, et al., "A 54×54-b Regularly Structured Tree Multiplier," IEEE Journal of Solid-State Circuits, vol. 27, No. 9, p. 1229 (1992).

Primary Examiner—Tan V. Mai
Attorney, Agent, or Firm—Robert Groover; Betty Formby; Matthew Anderson

[57] ABSTRACT

A multiplication circuit having a Booth decoder, a partial product generator and a computation and formatting circuit. An incrementing device is combined with the computation circuit, enabling an anticipated incrementation if it is desired to obtain a rounded result.

20 Claims, 5 Drawing Sheets

UNITED STATES PATENT AND TRADEMARK OFFICE
CERTIFICATE OF CORRECTION

PATENT NO. : 5,740,095

DATED : April 14, 1998

INVENTOR(S) : Philippe Parant

It is certified that error appears in the above-identified patent and that said Letters Patent is hereby corrected as shown below:

FIG. 1

UNITED STATES PATENT AND TRADEMARK OFFICE
CERTIFICATE OF CORRECTION

PATENT NO. : 5,740,095

DATED : April 14, 1998

INVENTOR(S) : Philippe Parant

It is certified that error appears in the above-identified patent and that said Letters Patent is hereby corrected as shown below:

FIG. 3

UNITED STATES PATENT AND TRADEMARK OFFICE
CERTIFICATE OF CORRECTION

PATENT NO. : 5,740,095

DATED : April 14, 1998

INVENTOR(S) : Philippe Parant

Page 5 of 5

It is certified that error appears in the above-identified patent and that said Letters Patent is hereby corrected as shown below:

FIG. 4